Dec. 29, 1953  J. A. SARGROVE  2,664,557
WEIGHT DEVIATION TESTING DEVICE
Filed June 20, 1952  4 Sheets-Sheet 1

Fig. I.

Inventor
John Adolph Sargrove
By Pierce Scheffler & Parker
Attorneys

Dec. 29, 1953   J. A. SARGROVE   2,664,557
WEIGHT DEVIATION TESTING DEVICE
Filed June 20, 1952   4 Sheets-Sheet 2

Inventor
John Adolph Sargrove
By Pierce, Scheffler & Parker
Attorneys

Dec. 29, 1953 J. A. SARGROVE 2,664,557
WEIGHT DEVIATION TESTING DEVICE
Filed June 20, 1952 4 Sheets-Sheet 3

Inventor
John Adolph Sargrove
By Pierce, Scheffler & Parker
Attorneys

Dec. 29, 1953 J. A. SARGROVE 2,664,557
WEIGHT DEVIATION TESTING DEVICE
Filed June 20, 1952 4 Sheets-Sheet 4

Inventor
John Adolph Sargrove
By Pierce, Scheffler & Parker
Attorneys

Patented Dec. 29, 1953

2,664,557

UNITED STATES PATENT OFFICE 2,664,557

WEIGHT DEVIATION TESTING DEVICE

John Adolph Sargrove, Shepperton-on-Thames, England, assignor to Sargrove Electronics Limited, London, England, a British company Application June 20, 1952, Serial No. 294,760

Claims priority, application Great Britain June 20, 1951

8 Claims. (Cl. 340—213)

This invention relates to control or indicating systems which may be of the electrically, pneumatically or hydraulically operated kind, but the invention may be applied also to purely mechanical control systems.

In the production of large quantities of articles which have one characteristic or property which is the same from article to article, it is very often required to test the articles in respect of that characteristic as they are produced and to provide an indication or a control function in response to which the manufacture of the articles can be controlled to maintain the characteristic at a predetermined value. For example, it may be required to produce articles which have a similar physical dimension or which have an electrical property such as resistance or capacitance which is the same from article to article; or again it may be desired to produce articles of constant weight. Purely for the sake of convenience, the present invention will hereinafter be described in relation to the production of articles of constant weight, but it will be understood that the invention can be applied to the control of manufacture to produce other constant physical characteristics in the articles produced.

In the past, many processes have been used for the production of articles of, for example, constant weight, and suggestions have been made of processes by which the weight of the articles thus produced is ascertained and is used to give an indication or a control function by which the weight of the articles as produced is or can be varied. In the simplest and most obvious of these processes each article, or samples, are weighed; if the article weighs more than a certain amount, the machine is adjusted to reduce the weight of the subsequent articles produced, while if the article weighs below a certain amount the weight of the subsequent articles is increased.

In the manufacture of any article, there must inevitably be a tolerance. For example, in manufacturing articles which are required to be of a predetermined weight, the articles can never be produced to be all of exactly the same weight, and at best it can be ensured that the weight of every article will be between an upper and a lower limit.

Still using weight control as an example, the weights of articles produced will all lie within an upper and a lower weight, and the value of these weights will depend on all the factors which contribute to weight variations in addition to the setting of that part of the machine which nominally controls the weight of the articles. If the predetermined limits within which the articles must lie are equal to or less than the upper and lower weights which the machine will produce for a given setting of the weight-controlling part of the machine, the automatic adjustment of that control is a simple matter, since it requires no more than that should an article, as produced, weigh more than the predetermined amount an immediate change of the setting can be effected in a correcting sense.

This condition is, however, rarely met in practice, and it is almost invariably the case that desired upper and lower limits represent tolerances, or deviations from a mean value, which are less than the extreme deviations to be expected. Some articles must, in fact, be rejected; the proportion of articles rejected to those passed will depend upon the acceptable limits in relation to the normal deviations.

In such circumstances, automatic control of the setting of the machine in response to the weight (or other) deviation of the articles is much more difficult, since if the weight of an article lies outside the prescribed limits there is no means of knowing whether it is one of the statistically occurring rejects, or whether its excessive deviation is due to some change of conditions in the machine or elsewhere which warrant a change of adjustment of the machine.

The present invention has for its object to provide an arrangement for securing an adjustment of the setting means of a machine of the type described which more nearly follows the optimum value. The invention is based upon an appreciation of the fact that if the machine is running in the best possible setting of the control then by the laws of statistical distribution the number of reject articles which fall above the upper acceptable limit will bear a known relation to the number which fall below the lower limit. In most cases the numbers will be the same, that is, of the inevitable rejects as many will be rejected because they are too big as are rejected because they are too small. If the acceptable limits are brought closer together, the proportion of rejects will increase (which can be statistically predicted) but this relation will still hold.

In accordance with the broadest aspect of the invention, in a machine of the type specified, means are provided for measuring the property of the article or product, or of detecting the departure of the value of that property from a predetermined value, and means are provided for comparing the number of articles which depart excessively from the said value in one sense, with those which depart excessively in the other sense, and means are provided for effecting an adjustment of the machine in accordance with a change, over a period, of the results of comparison.

In a simple arrangement according to the invention there can be used a weight deviation detecting device of any suitable type which is capable of detecting weight deviations above and below a predetermined value. When an article is found to have a weight which exceeds an upper limit, a voltage output is produced which is fed to a counting device. The nature of this counting depends upon the speed of operation; for low speeds an electromagnetic type of counter can be used, whilst for higher speeds an electronic type of counting circuit can be used. In the latter case, the output voltage may be first shaped and passed through an amplitude limiter. It is convenient, but not necessary, that the counter should give an indication of the number of pulses received.

A similar output voltage is obtained from the weighing means when an under-weight article is detected, and these voltages are fed to the same counting device, but so as to reduce the count each time; at any time, therefore, the count will represent the difference in number between overweight and under-weight articles.

When this difference attains a predetermined positive or negative value the weight adjusting means of the machine is actuated in the appropriate sense, and the counter is reset to zero.

It is highly advantageous if different weight deviations are set for effecting control and for effecting rejection. In such an arrangement the weights (or corresponding characteristic) of the articles or samples of the articles are ascertained and these weights are graded. An upper and a lower limit is set, outside which limits the article weight will be rejected. Within these limits two further limits are set up. If the weight of the article falls within the innermost of these limits, then no action will be taken either to reject the article or to make any effect in relation to a control function, that is, it will tend to maintain the status quo. If the weight of the article falls outside these innermost limits, but still within the rejection limits, an effect is produced which tends to produce a change in the indication or in the control function. If the weight of the article falls outside the rejection limits, this same effect is produced, but in addition the particular individual article is rejected. An article falling outside the rejection can be arranged to produce an effect, so far as indication or control is concerned, which is of the same magnitude or a greater magnitude than an article falling within the intermediate limits.

It has already been mentioned that with articles produced by any process, whether manual or mechanical, they will almost invariably show a truly statistical distribution of deviation from a norm or mean. In the case of weight, for example, it will always occur that there will be a small proportion of articles produced which show a large weight deviation above or below the norm, whilst a larger number of articles will show a lesser deviation. The few large variations will include the reject articles, and the outer reject limits can be set as desired. If the inner limits are appropriately set, the articles falling between these limits are those which are close to the average figure, and which will be most numerous when the machine is operating correctly. So long as this condition obtains, there will be, in general, an equal number of articles above and below these limits; in accordance with one feature of the invention, so long as these numbers are approximately equal over a given period of time, or for a given number of articles, no change is made in the indication or the control function. Should the weight of an article fall outside the outermost limits, that article is rejected, but the fact that one article has been rejected does not of itself result in a control function being carried out. Thus, the present invention makes possible the derivation of a control function which follows the mean of the weights of the articles and which is not disproportionately affected by the articles of wide deviation which will inevitably occur, and in which to a large extent the control function or control operation follows a statistical law.

With the apparatus of the invention it can also be arranged that at any moment the effect of the most recently weighed articles is greater than that of less recently weighed ones. In practice, if over a period of time the net result of the weighings is that the heavy articles are five in number more than the light, and then five light articles arrive in succession, the latter fact, though it may be mere statistical chance, is more likely to be due to some factor, such as a change of density, or a change in the mechanism warranting an adjustment. With the invention, by making the latest weighings of more importance the system is made more sensitive to further light weighings and the system will therefore respond to conditions warranting a change of the control function more rapidly than otherwise would be the case.

In some special circumstances, the statistical distribution of deviation may not be, or may not be desired to be, equally above and below the norm; in that case the limits can be set accordingly, on the effect of under or overweights on the control function can be dissimilar.

By way of example, embodiments of the invention will now be described, in conjunction with the accompanying drawings, in which.

Figure 1:
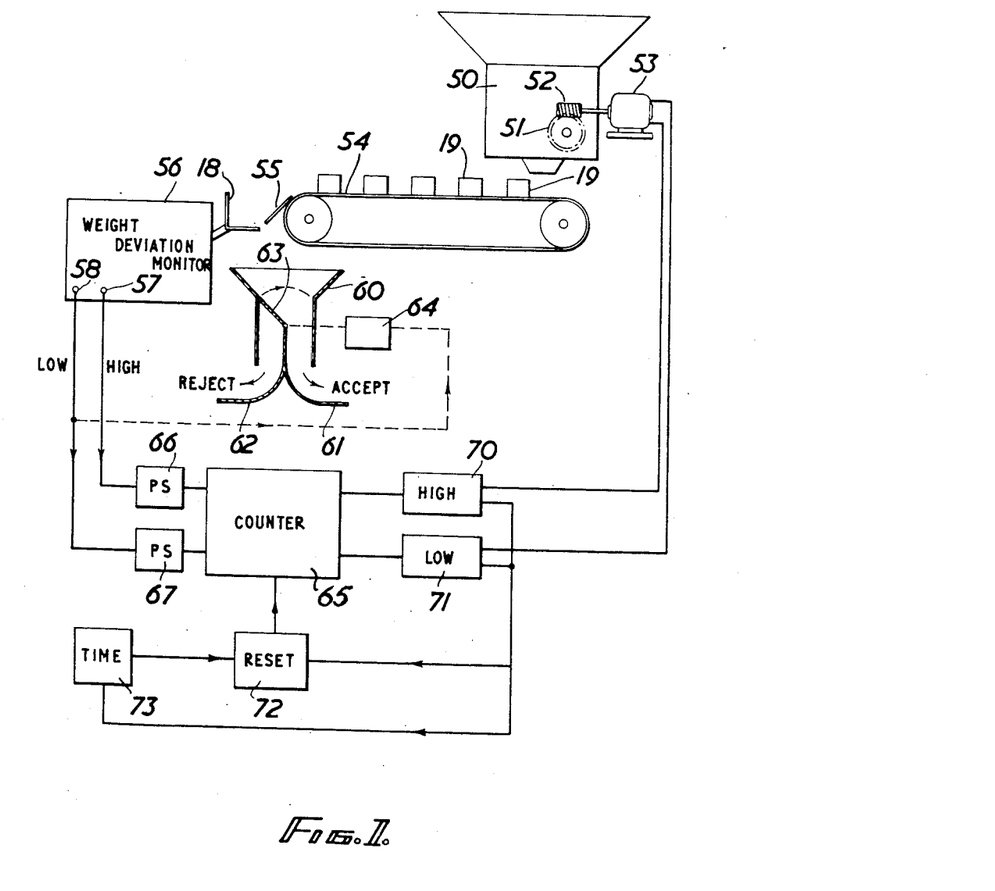
Figure 1 is block schematic diagram of a simple arrangement in accordance with the invention.

In Figure 1 the unit 50 is a moulding unit of known type for separating from a mass of material such as dough portions 10 of nominally constant weight. The volume of the portions is adjustable by means of a control member 51. In the known type of machine this is a handwheel, but for the purpose of the present invention the hand-wheel is replaced by a pinion drivable by a worm 52 on the shaft of a reversible electric motor 53. The effect of moving the control members 51 is to move one wall of a moulding chamber and thereby to vary the volume of the delivered portions.

The articles 19 fall upon a conveyor 54, and at the end of the conveyor they pass over a guide 55 and to the scale pan 18 of a weight deviation monitor 56. This unit rapidly determines whether the articles are over or under weight, within the predetermined limits and produces outputs on terminals 57 or 58 respectively if they are. When the article has been weighed the scale pan is released and the article falls into a guideway 60; the article may pass to an "accept" or "reject" outlet 61 or 62 in accordance with the setting of a guide flap 63 actuated by a device, such as a solenoid 64.

The outputs at terminals 57 or 58 are fed to a counter 65, through shaping networks 66, 67, which merely produce appropriate input voltages or pulses for the counter. The counter is such as to maintain an arithmetic count of the difference in number of the pulses which are applied to its two inputs; that is to say it will give a continuous record of the excess of the number of articles of overweight articles over underweight articles, or vice versa. The counter also includes means for producing an output when the number of overweight articles exceeds that of the underweight articles by a predetermined number, and an output when the number of underweight articles exceeds that of the overweight articles by a predetermined number which may or may not be equal to the other predetermined number. These outputs are fed respectively to a "high" control unit 70 and a "low" control unit 71, which energise, and determine the direction of rotation of, the reversible correcting motor 53. In addition, these control units control a "reset" unit 72 for the counter, restoring its effective count to zero. The reset unit 72 can also be reset by a timing unit 73, after a given time interval. The control units 70 and 71 also start the timing interval after each correction of the moulding.

The reject device 64 can be arranged to be operated by one or both of the outputs of the weight deviation monitor at 57 or 58.

Figure 2:
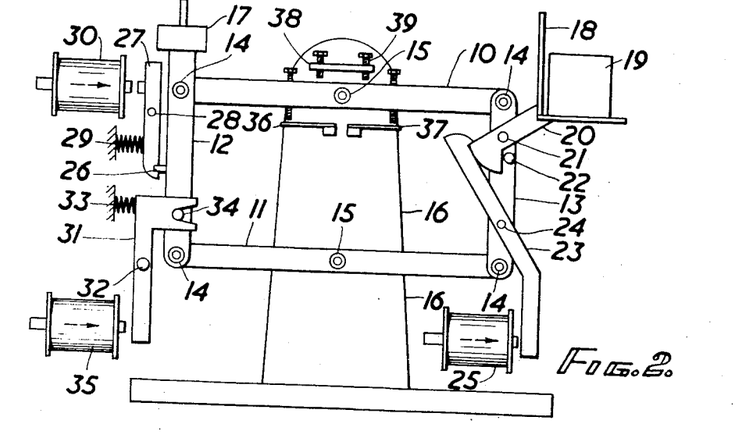
Figure 2 is a diagram showing the mechanical arrangement of a weighing device incorporating the invention.
Figure 3:
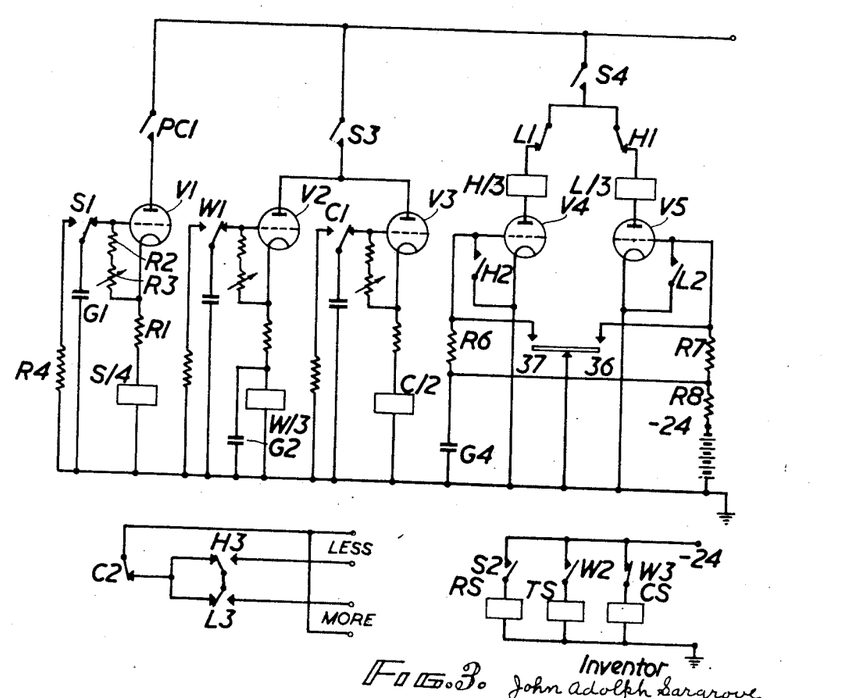
Figure 3 is a simplified circuit diagram of the apparatus associated with the weighing device of Figure 2.

A form of construction of weight deviation monitor which has been found satisfactory in practice is shown diagrammatically in Figure 2 and the associated electrical circuit is shown in Figure 3. The arrangements shown in these two figures of the drawings do not form per se part of this present invention.

In this weight monitor the scale pan 18, to which the articles are delivered from conveyor 54 is carried by a balance arm; this arm is held locked whilst the article is transferred to the weighing monitor, thereafter the arm is freed. If the portion is exactly equal in weight to the predetermined amount no motion of the balance arm results, but if there is a deviation from this amount the balance arm will move with an acceleration which is proportional to the value of the deviation. Means are then provided to respond to this acceleration, and also to the direction of motion of the arm.

The weighing apparatus comprises a parallel link structure consisting of two horizontal links 10 and 11, and two vertical joining links 12 and 13. These links are pivoted together by low friction bearings at 14, and the two links 10 and 11 are pivoted at their mid-points at 15 to a supporting standard 16. In practice, for rigidity, two such parallel link structures spaced apart are used, the corresponding members 10 and members 11 being securely fixed together by spacing members, but for simplicity these are not shown in Figure 1.

The link 12 carries a balance weight 17, which can be changed as necessary, and link 13 supports the pan 18 for an article 19 to be weighed. The pan is supported from link 13 by an arm 20, pivoted at 21 and spring biased so that when no article is upon the pan the arm will move to engage a stop 22. It can be retained in this position by a latching lever 23, pivoted at 24 to the link 13. The latching lever is also lightly spring-biased to the latching position, but can be moved by the armature of a "tip" solenoid 25 to free the arm 20 and permit the pan to tip. Normally there is no contact between the armature of the solenoid and the tail of the latching lever.

Associated with the arm 12 is a locking and centering mechanism. A lug 26 is fixed to the arm and is adapted to enter a slot in a locking arm 27, pivoted at 28 to a stationary part of the apparatus and biased by spring 29 to engage the lug. The arm can be moved to free it from the lug by a "release" solenoid 30. The centering mechanism comprises a centering arm 31, pivoted at 32 to a stationary part of the apparatus, and biased by a spring 33. This arm has on one face a detent, adapted to engage a pin 34 on the link 12. The edges of the detent are inclined so that under the spring loading the arm will pull in the balance arm accurately to a datum position. Beneath the balance arm is arranged a "center" solenoid 35, the armature of which when actuated in the direction of the arrow moves the locking arm against the spring loading and thus frees the balance arm.

A photoelectric system not shown, including a light source and a photosensitive cell, is provided for the purpose of detecting when an article is in position on the pan.

Associated with the link 10 are adjustable contacts 36 and 37, actuated when the arm has travelled a given amount from the mid, locked position, and adjustable stops 38, 39 are provided to limit the movement of the balance mechanism.

In Figure 3 is shown the simplified circuit diagram of a control device which is provided to respond to the photoelectric system, so as to actuate the balance arm releasing solenoid when an article has been placed upon the pan and has come to rest. When the balance arm is thus released the only force which will be applied to it will be the out of balance force due to the weight deviation of the article under test. If the weight of the article is exactly equal to the nominal weight the balance arm will not move. If however, the article is heavier than the nominal value the pan end of the balance arm will move downwardly with an acceleration which is proportional to the deviation of weight of the article.

The balance arm will thus move to close one set of contacts 36 or 37, and the time taken to actuate the contacts will likewise be proportional to the weight deviation of the article. It follows that with any given arrangement of parts and setting of the contacts, a weight deviation which represents the maximum permissible deviation will cause the contacts to close at the end of a certain time interval; if the contacts are actuated before that time interval the deviation exceeds the permissible value.

The control means is therefore arranged to respond to the actuation of the contacts and includes timing means by which it can distinguish whether or not the actuation of the contacts occurs within a given time interval after the operation of the balance arm releasing solenoid. The control means is arranged to distinguish in this way between actuation of the upper and lower contacts, corresponding to over- or under-weight of the portion. If there is a large deviation of weight it may occur that first one and then the other of the contacts are actuated within the predetermined time interval. It is therefore preferred to arrange that the control circuit responds to the first actuation only of the contacts.

Means are also provided for adjusting the maximum deviation values which the control means can distinguish. This can be done by variation of the adjustment of the contacts on the balance arm, but as these contacts are normally somewhat inaccessible it is preferred to make the adjustment by variation of the timing interval in the control means. In any case, after the timing interval has elapsed the latch release solenoid is operated by the control means and the portion is discharged from the pan.

Turning now to Figure 3, this circuit includes a "settle" timer tube $V_1$. At the beginning of the cycle of operation the anode circuit of this tube is interrupted at contacts $PC_1$; when an article is deposited upon the pan and is detected by the photocell the contacts $PC_1$ close.

Tube $V_1$ includes a resistor $R_1$ and a relay $S/4$ in its cathode circuit; the grid-cathode circuit includes a fixed and an adjustable resistor $R_2$ and $R_3$, and the grid is connected through the contacts $S_1$ of relay $S$ and a capacitor $G_1$ to ground.

At the instant when contacts $PC_1$ close, the two terminals of capacitor $G_1$ are at the same potential. Plate current begins to flow in the tube, but this tends to make the cathode more positive; because of capacitor $G_1$ the grid cannot immediately follow this potential rise of the cathode, though connected to it through resistors $R_2$ and $R_3$, but only at an exponential rate determined by the time constant of the circuit through which $G_1$ charges. Hence, after a time interval, adjustable by resistor $R_3$, the plate current will reach a value when relay $S/4$ operates. Contacts $S_1$ change over, and capacitor $G_1$ is discharged through a small current limiting resistor $R_4$. Relay contact $S_1$ thereby remains operated until contacts $PC_1$ open again. Contacts $S_2$ are in series with the winding $RS$ of the "release" solenoid 30. Contacts $S_3$ are included in the anode circuit of two tubes $V_2$ and $V_3$, which are arranged in timing circuits similar to that of tube $V_1$, and will not therefore be further described. Tube $V_2$ includes relay $W/3$ in its cathode circuit, shunted by a capacitor $G_2$; the changeover contacts $W_1$ of this relay are in the grid circuit of tube $V_2$, the contacts $W_2$ are included in series with the winding $TS$ of the "tip" solenoid 29, and the normally closed contacts $W_3$ are in series with the windings $CS$ of the "center" solenoid 35.

At the instant that relay $S/4$ operates, as described above, the "center" solenoid winding $CS$ is energised over contacts $W_3$, so that when the release solenoid winding $RS$ is energised over contacts $S_2$ the balance is free to move in accordance with the weight of the article 19 on the pan.

For the moment it will be assumed that the article is of exact weight, and no movement of the balance takes place. Both tubes $V_2$ and $V_3$ begin to draw current and after time delays the relays $W/3$ and $C/2$ in their cathode circuits will operate. Tube $V_2$ time delay is used to determine the weighing time; tube $V_3$ time delay determines the correction time, which will be referred to further below.

At the end of the weighing time relay $W/3$ operates; contacts $W_1$ open in the timing circuit of tube $V_2$, contacts $W_2$ close and energise the "tip" solenoid winding $TS$ and contacts $W_3$ open to de-energise the "center" solenoid winding $CS$. When the tip solenoid is thus energised the article falls from the tilted pan. The "center" solenoid, now de-energised, permits the centering lever 31 to move under the tension of spring 33 to center the link 12 and with it the balance.

At the end of the timing period of tube $V_3$ relay $C/2$ operates and contacts $C_2$ which are included in a correction circuit, open.

When the article has been tipped from the pan, the photocell detector again has light incident upon it, the contacts $PC_1$ open. Relay $S/4$ releases, contacts $S_2$ open and relays $W/3$ and $C/2$ also release. The locking lever locks the link 12 in position; after a short interval due to the capacitor which shunts the relay $W/3$, contacts $W_3$ close and the centering arm 31 is disengaged from pin 34. No further action takes place until the next article is perceived.

Tubes $V_4$ and $V_5$ are the tubes which are used for responding to the balance contacts 36, 37. The cathodes of these two valves are grounded, and the grids are returned through resistors $R_6$, $R_7$ and $R_8$ to a point of negative potential which is shown as being the negative terminal of the supply for the solenoids; a bypass capacitor $G_4$ is included. The plate circuits of the tubes include respectively the "high" relay $H/3$ and the "low" relay $L/3$, and the contacts $L_1$ and $H_1$ of those relays; both plate circuits of both tubes include contacts $S_4$ of relay $S/4$. Contacts $H_2$ of relay $H/3$ are arranged between grid and cathode of tube $V_4$, and contacts $L_2$ of relay $L/3$ between grid and cathode of tube $V_5$. Contacts 33 and 37 when closed are arranged to connect the grids of valves $V_5$ and $V_4$ to ground.

When the settle relay $S/4$ operates at the end of the settling time, contacts $S_4$ close, and applies plate voltage to the two tubes $V_4$ and $V_5$. Contacts 36 and 37 and $H_2$ and $L_2$ are all open, and so the grids of the tubes are negative with respect to the cathodes; the anode currents are both virtually zero, and relays $L/3$ and $H/3$ are unenergised.

From the description given above, at the end of the weighing time determined by the timing circuit of tube $V_2$, it will be understood that contacts $S_4$ will open; if, therefore, contacts 36 or 37 have not been closed due to the weight deviation of the article being less than a certain amount, at the end of this period the contacts $S_4$ will open and no further change takes place.

If, however, the article is sufficiently heavy, contacts 37 will close; the grid of tube $V_4$ is then at the same potential as the cathode and substantial plate current flows in the tube. Relay $H/3$ operates; its contacts $H_1$ open in the circuit of tube $V_5$, thus rendering that tube inoperative, and contacts $H_2$ close in parallel with contacts 37. In this way the two tubes respond to the first closure of contacts 36 or 37 and do not respond to any further closure of those contacts until contacts $S_4$ open again.

If contacts 36 close before contacts 37 the operation is very similar except that relay $L/3$ operates instead of H/3, and tube V₄ is rendered ineffective.

The correction circuit is effected through contacts C₂ and either H₃ or L₃. Since contacts C₂ are normally closed, the correction circuit will be operative only while relay C/2 is closed only until the end of the timing period of tube V₃. The correction circuit corresponds to the outputs at terminals 57 and 58 of Figure 1.

It will be seen from the preceding description that the correction circuits are closed for a varying period of time, but this is not necessary for the purpose of the present invention. If desired, tube V₃ and its immediately associated parts can be dispensed with.

The counter 65 can be of either the electromechanical kind, or it can be electronic. A simple form of electromechanical counter is shown diagrammatically in Figure 4. This comprises a ratchet wheel 80 on a shaft 81 which can be driven in the anticlockwise direction by a pawl 82 moved by the armature 83 of a relay-type solenoid 84. Ratchet wheel 80 carries a pin 85 which is adapted to engage a spring contact 86 when the wheel has been advanced a given number of tooth positions.

Figure 4:
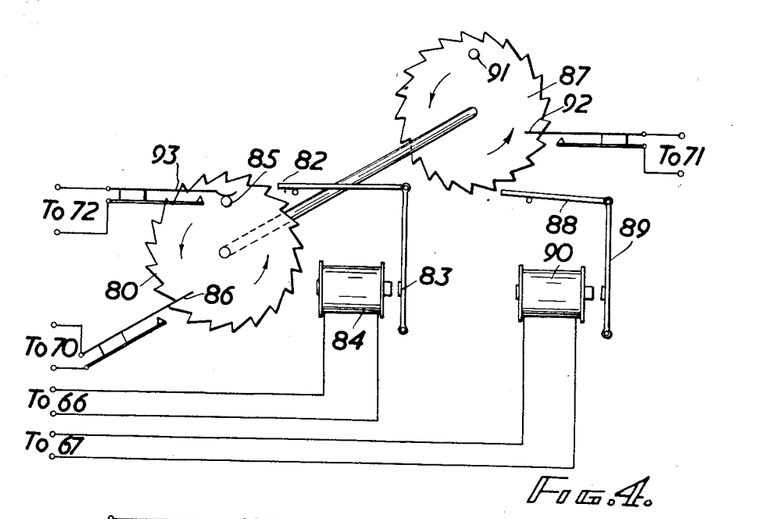
Figure 4 is a diagrammatic sketch of a counting or registering device which can be used.

On the same shaft 81 is a second, similar ratchet wheel 87 but which can be driven in clockwise direction by pawl 88 moved by the armature 89 of solenoid 90. Ratchet wheel 87 carries a pin 91 which is adapted to engage a spring contact 92 when the wheel has been advanced a given number of tooth positions. Contacts 86 and 92 can both be adjusted in position round the ratchet wheels so as to vary the numbers of tooth positions that the wheels have to be advanced before they are engaged by pins 85 or 91.

It will be seen that as pulses of current are applied to the solenoids 84 and 90 from the pulse shapers 66 and 67 (which in this case will be required to deliver short current pulses sufficient only to cause the solenoids to operate) the ratchet wheels will be moved in one direction or the other till contacts 86 or 92 are operated. These contacts are connected to units 70 or 71, thereby to cause the correction motor 53 to be energised for a short, predetermined time.

The ratchet wheels can be reset by energising one of the solenoids until pin 85 opens a pair of contacts 93, under the control of the reset unit 72.

The unit 65 can be of the purely electronic type, in which case known types of electronic counter circuits can be used; circuits of the binary type, or those employing multi-cathode discharge tubes, and operated in a decimal or a mixed binary-decimal system can be employed. Alternatively, and in a manner which is similar to a device described hereinafter, on each input from unit 66 a small capacitor, charged to a high voltage, is connected to a much larger capacitor. A similar small capacitor, but oppositely charged, is connected to the larger capacitor when there is input from unit 67. Hence, at any moment the charge on the capacitor is a function of the arithmetic sum of the number of inputs from the two units. When the capacitor potential reaches a predetermined positive or negative value an output can be obtained.

In any case, the result will be that there is a correction of the volume, and hence the weight, of the article 19 only when the number of articles showing excessive deviation of weight in one sense exceeds the number of articles showing excessive deviation in the opposite sense.

In a further embodiment of the invention now to be described two further advantageous features are involved: in the first place the limits of weight deviation at which rejection occurs are made different from those at which deviation has reached a significant value, and secondly the effect of later weighing is made of more importance than earlier weighings.

In this embodiment of the invention use can be made of the same moulding machine 50, conveyor 54 and guideway 60 as shown in Figure 1. A weighing scale similar to that of Figure 2 is employed, and circuit means as in Figure 3 are used for releasing the balance arm after a predetermined interval, and for relocking it after a further interval. For this purpose tubes V₁ and V₂ only are necessary, in conjunction with the photocell system operating contacts PC1. Moreover, the contacts 36 and 37 of the weighing scale are not made use of, but in their place a photoelectric system is employed.

Figure 5:
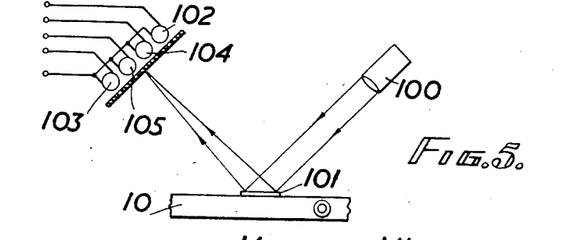
Figure 5 is a diagrammatic sketch of a modified photoelectric arrangement of the weighing means.

This is shown in Figure 5. An optical system 100 is provided for projecting a beam of light onto a polished flat surface or mirror 101 moving with the scale arm 10, and the reflected beam of light falls upon one of a series of four photocells 102, 103, 104, 105. These photocells are set up at points which correspond respectively to upper and lower rejection limits and two intermediate points corresponding to the intermediate limits at which there is no rejection but at which the correction effect is required. The absolute value of these levels can be adjusted by moving the series of photocells towards or away from the mirror or relatively to each other.

Figure 6:
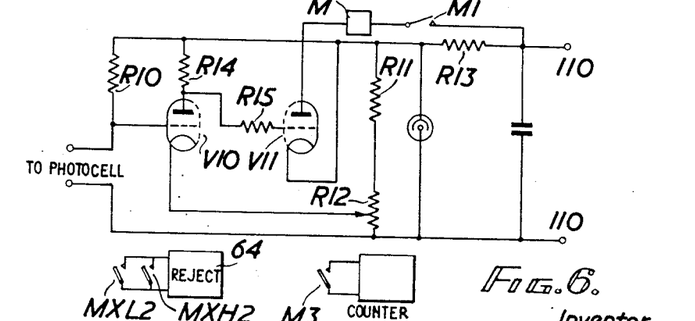
Figure 6 is a fragmentary and partly block diagram of a suitable photocell amplifier.

Each of the photocells is associated with an electrical circuit, shown in Figure 6, the circuit for each photocell being similar. In each circuit the photocell is connected in series with a high resistance R₁₀ across the terminals 110 of a suitable source of high tension plate current, and the voltage appearing across the cell is applied to the grid cathode input circuit of a triode tube V₁₀, conveniently the first tube of a double triode V₁₀, V₁₁. The cathode of the tube V₁₀ is connected to a variable potential divider R₁₁. R₁₂ also across the plate supply, so that the grid of the tube is negatively biased with respect to the cathode. It is preferable that the plate supply used, is stabilised by means of a resistor R₁₃ and discharge tube V₁₂ of known type. The plate of tube V₁₀ is provided with a load resistor R₁₄ and a coupling resistor R₁₅ is connected between this plate and the grid of the tube V₁₁. The cathode of tube V₁₁ is returned to the positive terminal of the plate supply and the plate of the second tube is connected through a relay M to the unstabilised plate supply. The photocell used is of the barrier layer type and briefly, the effect of the circuit is that when light falls upon the photocell, there is a very rapid and definite operation of the relay M included in the plate of the tube V₁₁.

There are four units such as that shown in Figure 6, each with a relay corresponding to relay M; the individual relays can be identified as ML and MH, which will operate respectively if the article is light or heavy, and MXL and MXH which will operate if the article exceeds the light or heavy rejection limits respectively.

It is important that if the balance arm should oscillate, so that say, cell 104 is first illuminated, followed by cell 105, only the relay corresponding to the first illuminated cell should operate.

For this reason, in each unit as shown in Figure 6 contacts at $M_1$ are included in series with the relay M. The units are then arranged in pairs, the two units which are responsive to photocells 102 and 103 being associated, and the units responsive to photocells 104 and 105 also being associated. In each pair of units the $M_1$ contact of the one unit is included in the circuit of the M relay of the other. In this way once the M relay of one unit of a pair has operated the circuit of the relay of the other unit is open circuited. Contacts, such as $M_3$ of the various M relays can be used to operate electromechanical counters 110. The relays MXH and MXL associated with the two outermost photocells have contacts $MXH_2$ and $MXL_2$ which are used to operate the rejection device 64. The relays MH and ML associated with the two inner cells 104 and 105 are provided with changeover contacts $MH_2$ and $ML_2$, shown in Figure 7. The back contacts $MH_2$, that is to say, those which are closed when light does not fall upon the photocell, are used to connect a small capacitor $G_{10}$ to a source of positive stabilised voltage, of the order of 100 volts, through a resistor $R_{20}$ for each set of contacts. When relay MH is operated, contacts $MH_2$ change over and the now charged capacitor $G_{10}$ is connected in parallel with a substantially larger capacitor $G_{11}$ to vary the charge maintained in that capacitor.

Figure 7:
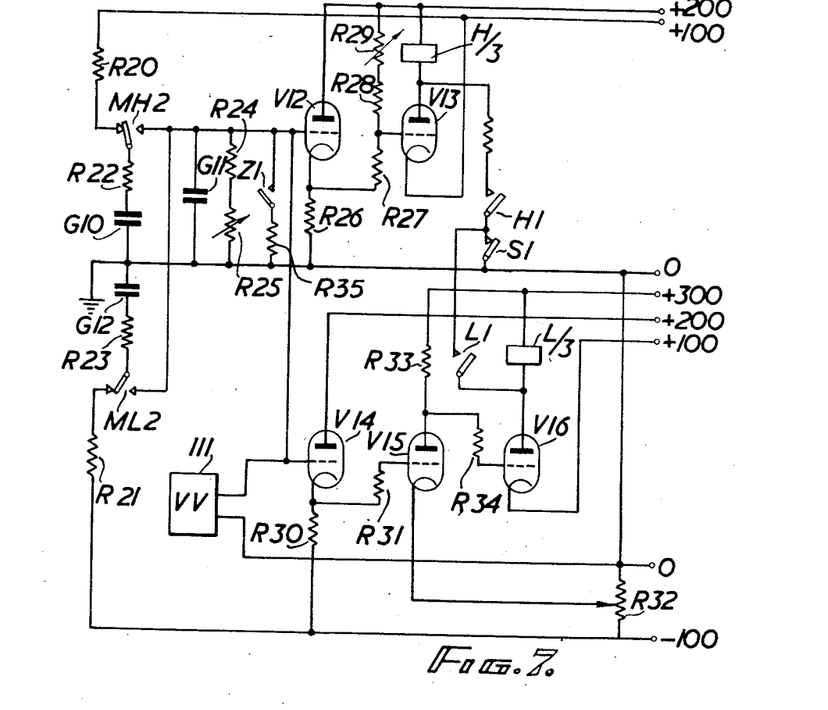
Figure 7 is a circuit diagram of an electronic registering device.

Back contacts $ML_2$ of relay ML are likewise arranged to connect a small capacitor $G_{12}$ through a resistor $R_{21}$ to a voltage source, but in this case the voltage is negative. Hence, when relay ML operates capacitor $G_{12}$ is connected in parallel with capacitor $G_{11}$ and depending on the charge on it at that instant will reduce its charge if it is positive, and make it negative, or more negative, if it is uncharged or negatively charged. Small current limiting resistors $R_{22}$ and $R_{23}$ are included in the circuits of capacitors $G_{10}$ and $G_{12}$. Capacitor $G_{11}$ therefore acts as an integrating device and at any moment its charge will represent the summed effect of the previous actuations of the relays. It is arranged, however, that the effect of earlier weighings is gradually cancelled with time. This is done by connecting across the larger capacitor a variable resistance network $R_{24}$, $R_{25}$ so that the charge on the capacitor $G_{11}$ is gradually leaking away. The time constant is made appropriate to the rate of weighings, so that at any moment the integrated charge corresponds to a substantial number of weighings.

The larger capacitor is connected in the inputs to two parallel channels. The first channel comprises a cathode follower stage coupled to an amplitude limiter.

The cathode follower stage comprises triode tube $V_{12}$ having cathode load resistor $R_{26}$, direct coupled over resistor $R_{27}$ to triode tube $V_{13}$. The control grid of tube $V_{13}$ is returned to a point of positive potential through high valve resistors $R_{28}$, $R_{29}$, and the cathode of the tube is returned to a point of somewhat less positive potential. The plate circuit of tube $V_{13}$ includes relay H/3, and the plate can be connected to ground through relay contacts $H_1$ and $S_1$. Normally, with capacitor $G_{11}$ discharged tube $V_{13}$ is cut off, and relay H/3 unoperated.

The second channel is generally similar to the first except that it includes a phase inverter stage; the channel comprises triode cathode follower tube $V_{14}$, with cathode resistor $R_{30}$ returned to a point of negative potential, coupling resistor $R_{31}$ to phase inverter tube $V_{15}$. Tube $V_{15}$ cathode is returned to a point on potential divider resistor $R_{32}$ and the plate circuit includes load resistor $R_{33}$ and is coupled to tube $V_{16}$ over resistor $R_{34}$. Tube $V_{16}$ has its cathode returned to a point of positive potential, and in its plate circuit is relay L/3. The plate circuit can be shunted by relay contacts $L_1$ and $S_1$.

Normally both tubes $V_{13}$ and $V_{16}$ are cut off, but if the charge on capacitor $G_{11}$ reaches a certain level after a predetermined number of actuations of relay MH/3 within a given time interval, tube $V_{13}$ passes current, relay H/3 operates and by its contact $H_1$ locks in. The operation of relay L/3 in the event of a series of actuations of relay ML/3 is similar. A valve voltmeter 111 of the center zero type can be connected in parallel with capacitor $G_{11}$ to give an indication at any moment of the statistical weight deviation. It will be appreciated that the relative capacitances of capacitors $G_{10}$ and $G_{12}$, and $G_{11}$ will determine the number of weighings necessary to produce actuation of relays H/3 or L/3; resistor $R_{25}$, in conjunction with capacitor $G_{11}$ will control the "memory time."

Figure 8:
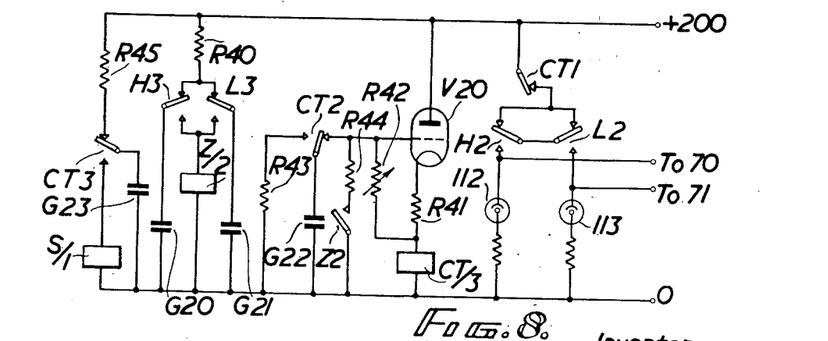
Figure 8 is a circuit diagram of a timing unit associated with the circuit of Figure 7.

If relay H/3 operates a correction circuit is prepared over contacts $CT_1$, $L_2$ and $H_2$, Figure 8, to control unit 70, which in this case need be no more than a relief relay controlling the correction motor 53. At this time, however, contacts $CT_1$ are open, and no correction takes place. Similarly, if relay L/3 operates, a correction circuit is prepared over contacts $CT_1$, $H_2$ and $L_2$, to control unit 71, for causing the motor to run in the reverse direction. Indicator lamps 112 and 113 can be employed to show when correction takes place.

When either relay H/3 or L/3 operates, a timing and resetting circuit is operated. This includes a relay Z/2; contacts $H_3$ are arranged normally to charge positively through resistor $R_{40}$ a capacitor $G_{20}$, and contacts $L_3$ similarly charge a capacitor $G_{21}$. When contacts $L_3$ or $H_3$ change over, capacitor $G_{20}$ or $G_{21}$ is connected to relay Z/2 and the capacitor charge is sufficient to cause momentary actuation of the relay. Thereupon, contacts $Z_1$ close to discharge through resistor $R_{35}$, the main capacitor $G_{11}$, to restart the integrating process.

Contacts $Z_2$ are associated with a timing tube $V_{20}$, which is similar to the timing circuits shown in Figure 3. Tube $V_{20}$ has a cathode resistor $R_{41}$ in series with a relay CT/3. The grid circuit includes a resistor $R_{42}$. A capacitor $G_{22}$ is connected to the grid of tube $V_{20}$ over contacts $CT_2$, but can be discharged over the back contacts $CT_2$ through resistor $R_{43}$ when relay CT/3 is operated. Contacts $Z_2$ shunt the grid circuit of tube $V_{20}$, through resistor $R_{44}$.

Tube $V_{20}$ is normally passing current, and relay CT/3 is operated; capacitor $G_{22}$ is connected to the grid of tube $V_{20}$.

When relay Z/2 operates, as described above, contacts $Z_2$ close momentarily and cause the grid of valve $V_{20}$ to become more negative; the plate current drops, and relay CT/3, normally operated, releases. Capacitor $G_{22}$ is connected to the grid of tube $V_{20}$, and the plate current of the tube rises slowly.

When relay CT/3 releases, its contacts $CT_1$ close and the correction circuit is completed over contacts $CT_1$, $L_2$ and $H_2$. Contacts $CT_2$ change-over as described, and contacts $CT_3$ changeover. Thereby a capacitor $G_{23}$, normally connected across a relay S/1 is connected to a point of positive potential through resistor R₄₅, and begins to charge up.

The correction motor runs for only a short time, since it is better to correct in small steps, so as to avoid any tendency to over-correction. Hence, the time constant of timing circuit tube V₂₀ is made quite short but can be adjusted by R₄₂. Relay CT/3 therefore operates again; contacts CT₁ open the correction circuit; contacts CT₂ changeover and discharge capacitor C₂₂ and contacts CT₃ cause relay S/1 to operate momentarily. Contacts S₁ open in the "hold" circuit of relay H/3 or L/3 and restore the circuits to normal.

It is not necessary that an integrating device of the kind described should be used, and it is possible to use a digital type of correction circuit—that it to say one in which a digital register is set up for the indicated value of the deviations, means being provided to cancel the effect of weighings which have taken place a predetermined number of weighings in advance or a predetermined time in advance of the preset discrimination conditions.

We claim:

1. In an apparatus for manufacturing articles having a characteristic nominally constant value from article to article, testing means responsive to the value of the said characteristic of an article for producing a first response function when said value exceeds a predetermined limit, and a second response function when said value falls below a predetermined limit, conveyor means for conveying articles in succession to said testing means and means for discharging said articles from said testing means after testing, a control unit for responding to successive response functions produced on successive testings, said control unit including an integrating device responding differentially to said first and second response functions, means controlled by said integrating device for producing an output when the number of the one exceeds the number of the other to a predetermined extent and means for decreasing with the passage of time the response of said integrating device.

2. In an apparatus for manufacturing articles having a characteristic of nominally constant value from article to article, testing means for automatically testing said articles in succession in respect of said characteristic and for determining if the deviation of the value of said characteristic from the nominal value is excessively positive or excessively negative, a registering device coupled to said testing means for registering differentially the numbers of said excessive positive and negative deviations, control means coupled to said registering device for producing a control function when the differential between said numbers exceeds a predetermined amount, and means for decreasing with the passage of time the number registered by said registering device.

3. In an apparatus for manufacturing articles having a characteristic of nominally constant value from article to article, testing means for automatically testing said articles in succession in respect of said characteristic, and for determining if the deviation of the value of said characteristic from the nominal value is excessively positive or excessively negative, a first capacitor, a second capacitor and a third capacitor, switch means operated by said testing means to connect said first capacitor to said third capacitor to vary the charge on said third capacitor in one sense when an excessively positive deviation occurs, switch means operated by said testing means to connect said second capacitor to said third capacitor to vary the charge on said third capacitor in the opposite sense when an excessively positive deviation occurs, and voltage-responsive means connected to said third capacitor.

4. An apparatus as claimed in claim 3, and comprising conveyor means for presenting articles to said testing means at roughly regular intervals, and means for discharging said third capacitor in a time substantially greater than one of said intervals.

5. An apparatus as claimed in claim 4, wherein said discharging means is continuously connected to said capacitor.

6. In an apparatus for manufacturing articles having a characteristic of nominally constant value from article to article, testing means for automatically testing said articles in succession in respect of said characteristic, and for determining if the deviation of the value of said characteristic from the nominal value is excessively positive or excessively negative, a registering device, registering means operated by said testing means for increasing in a positive sense the quantity registered by said device when an excessively positive deviation occurs and for increasing in a negative sense the quantity registered by said device when an excessively negative deviation occurs, a positive limiting means responding to the quantity registered by said device when the quantity attains a predetermined positive value, a negative limiting means responding to the quantity registered by said device when the quantity attains a predetermined negative value, and means for reducing with the passage of time the quantity registered by said device.

7. In an apparatus for manufacturing articles having a characteristic of nominally constant value from article to article, testing means for automatically testing said articles in succession in respect of said characteristic, and for determining if the deviation of the value of said characteristic from the nominal value is excessively positive or excessively negative, a registering device, registering means operated by said testing means for increasing in a positive sense the quantity registered by said device when an excessively positive deviation occurs and for increasing in a negative sense the quantity registered by said device when an excessively negative deviation occurs, a positive limiting means responding to the quantity registered by said device when the quantity attains a predetermined positive value, a negative limiting means responding to the quantity registered by said device when the quantity attains a predetermined negative value, said testing means being arranged to detect the said excessive positive and negative deviations and in addition at least one further and more excessive deviation, a rejection means for rejecting articles, and operating means for operation of said rejection means when said testing means detects said more excessive deviation.

8. In an apparatus for manufacturing articles having a characteristic of nominally constant value from article to article, testing means for automatically testing said articles in succession in respect of said characteristic and for determining if the deviation of the value of said characteristic from the nominal value is excessively positive or excessively negative, a registering device coupled to said testing means for registering differentially the numbers of said excessive positive and negative deviations, indicating means coupled to said registering device for producing an indicating function when the differential between said numbers exceeds a predetermined amount, and means for decreasing with the passage of time the number registered by said registering device.

JOHN ADOLPH SARGROVE.

References Cited in the file of this patent

UNITED STATES PATENTS

| Number | Name | Date |
|---|---|---|
| 1,983,388 | Moore | Dec. 4, 1934 |
| 2,051,018 | Umansky | Aug. 11, 1936 |
| 2,343,240 | Molins et al. | Mar. 7, 1944 |
| 2,398,987 | Ziebolz | Apr. 23, 1946 |
| 2,477,395 | Sunstein | July 26, 1949 |
| 2,482,610 | Burn | Sept. 20, 1949 |
| 2,556,374 | Koechel | June 12, 1951 |
| 2,605,332 | Parsons | July 29, 1952 |